F. D. Ballou.

Boots & Shoes.

No. 3390. Reissued Apr. 20. 1869.

Witnesses
John L. Nash
Freeman P. Howland.

Inventor
Francis L. Ballou

UNITED STATES PATENT OFFICE.

W. N. ELY, OF STRATFORD, CONNECTICUT, ASSIGNEE, BY MESNE ASSIGNMENTS, OF F. D. BALLOU.

IMPROVEMENT IN THE MANUFACTURE OF SEWED BOOTS AND SHOES.

Specification forming part of Letters Patent No. 26,808, dated January 10, 1860; Reissue No. 3,390, dated April 20, 1869.

*To all whom it may concern:*

Be it known that I, FRANCIS D. BALLOU, of Abbington, in the county of Plymouth and State of Massachusetts, have invented a new and useful Improvement in Manufacturing Sewed Boots and Shoes; and I do hereby declare that the following is a full, clear, and exact description thereof, reference being had to the accompanying drawings, forming a part of this specification, in which—

Figure 1:
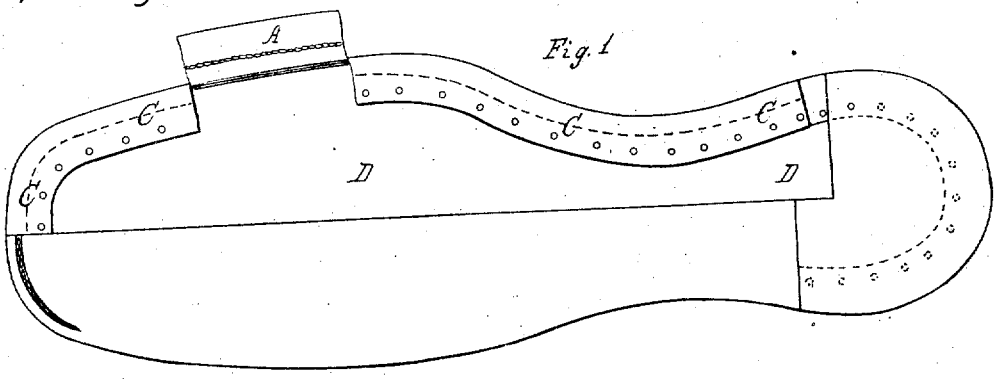
Figure 2:
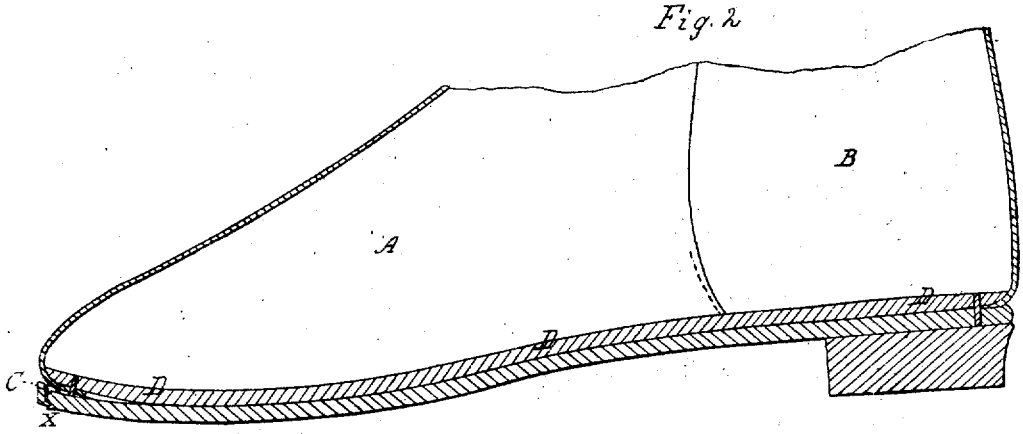
Figure 3:
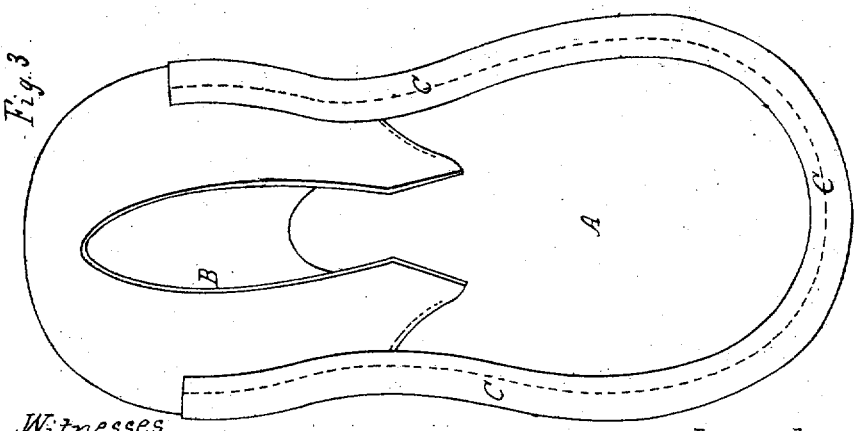

Figure 1 represents a view of the bottom of a shoe with the heel and one-half of the outer sole removed, showing clearly the manner of securing the welt to the upper-leather and to the inner sole of the shoe. This figure also shows the manner of securing both welt and inner sole to the outer sole. Fig. 2 is a longitudinal central section, taken through the shoe, of Fig. 1. Fig. 3 is a plan view of the upper-leather of the shoe fitted, and with the welt sewed to its edges. This figure shows the manner of presenting the upper to the sewing-machine for stitching the welt, or previously to lasting it.

Similar letters of reference indicate corresponding parts in the several figures.

The object of this invention and improvement in making boots and shoes is to enable the manufacturer to perform the work which is now done by hand, and to make the entire boot or shoe by any ordinary sewing mechanism for carrying waxed thread, with the exception of putting on the heel, which is a very simple and comparatively easy operation when the sole has been properly attached.

This improvement enables the manufacturer of boots and shoes to put together his work with great facility, and as a great saving of time is accomplished, there will be less expense attending the manufacture of sewed shoes, and they may be furnished below the present market value of pegged shoes.

Another great advantage in my invention is that the entire work of sewing about a boot or shoe can be performed in a neat and perfect manner by ordinary workmen and those unskilled in the present art of making boots and shoes. Therefore the expense of workmen will be much reduced, while the work can be made equal, if not superior, in strength and durability to those at present furnished to the market.

For the purpose of affecting the aforesaid objects, my invention consists in sewing the welt-sole or welt-strip of leather to the leather upper, which is previously fitted as near the edge of the same as may be found necessary by waxed-thread sewing-machines. In this shape the work can be presented to the sewing-machine with great facility. The upper, with the welt-strip thus attached, may be lasted by tacking, pegging, or nailing the edges of both welt and upper to the inner sole. The outer sole, when there is to be an outer sole separate from the welt-sole, is then attached by sewing through the edge of the welt and edge of the outer sole, as will be hereinafter shown, and the shoe is ready for trimming and finishing in the usual manner, the entire work being done with the ordinary waxed-thread sewing mechanism in a neat and efficient manner. Where the welt-sole is attached the shoe must be turned as in what is termed "turned" work.

To enable those skilled in the art to fully understand my invention, I will proceed to describe my mode of making boots and shoes.

The leather upper, vamp A, and heel portion B being properly cut out and fitted or stitched together at the sides, as shown by Fig. 3, the welt C, which in this case is simply a narrow trimmed strip of sole-leather, is then laid upon the outside surface of the upper with its thin edge even with the edge of the upper, and in this position it (the upper) is passed through the sewing-machine and the welt stitched to it, the stitches running as near the edge as is found desirable. When this is done the upper, with the welt stitched to it, as shown by Fig. 3, is lasted in the usual manner; but the edges of the upper and welt are pegged or nailed to the inner sole, D, as shown by Fig. 1, where a portion of the outer sole is removed. The tacks continue round the heel portion after they leave the welt, and the entire upper is tacked or pegged before it is ready to receive the outer sole. The advantage of thus securing the welt to the upper previous to lasting is, that when the stitching is done by sewing mechanism the operation can be accomplished with great facility and ease, and the parts will be more securely attached, while at the same time the lasting of the upper can be effected by simply tacking or pegging both the welt and upper to the inner sole, thus obviating the slow and inefficient method of sewing through and through these parts with the hand, an operation which cannot be easily performed by machinery.

It is important here to state that the present method of securing the inner and outer soles to the upper of the boot or shoe is exceedingly tedious and laborious, and is the most difficult work of all to be performed; while with my plan the welt is not only stitched to the upper, but additional strength is given to the shoe by securing the welt and upper to the inner sole, as above stated, and as shown by Fig. 2. When the welt-sole is itself to be the outer sole the upper is to be turned inside out and the welt-sole sewed onto it and then the shoe turned.

Having thus completed the lasting of the shoe, the outer sole or soles, as the case may be, is grooved round the edge with a knife in the common way, and a portion of the leather raised, as shown at *x*, Fig. 2. The shoe is then passed through a sewing-machine of a peculiar construction, for which I shall hereafter apply for a patent, and the groove is kept open, so that the stitches will all follow in the channel. The outer sole is thus stitched to the welt, trimmed, and finished up in the usual manner of making sewed boots or shoes.

My invention is intended to apply to sewing by what are known as "waxed-thread sewing-machines," using the crochet or barbed needle, as any other than waxed thread is unfit for any but the lightest work, and waxed thread cannot be used with an eye-pointed needle.

What I claim as an improvement in the manufacture of boots and shoes is—

1. The combination of the welt and upper with a series of waxed-thread stitches uniting the two, when the same is accomplished by means of a hook-needle waxed-thread sewing-machine, substantially as described.

2. The combination of the welt and sole with a series of waxed-thread stitches uniting the two, when the same is accomplished by means of a hook-needle waxed-thread sewing-machine, substantially as described.

In witness whereof I have hereto signed the foregoing specification.

F. D. BALLOU.

Witnesses:

GEO. A. BEAL,

JOSHUA L. NASH.